United States Patent
Okita et al.

(10) Patent No.: US 9,606,225 B2
(45) Date of Patent: Mar. 28, 2017

(54) PERIPHERAL OBJECT DETECTION APPARATUS AND PERIPHERAL OBJECT DETECTION METHOD

(71) Applicants: Toshinori Okita, Gotenba (JP); Jun Itoh, Kobe (JP)

(72) Inventors: Toshinori Okita, Gotenba (JP); Jun Itoh, Kobe (JP)

(73) Assignees: TOYOTA JIDOSHA KABUSHIKI KAISHA, Toyota-shi, Aichi-ken (JP); FUJITSU TEN LIMITED, Kobe-shi, Hyogo-ken (JP)

( * ) Notice: Subject to any disclaimer, the term of this patent is extended or adjusted under 35 U.S.C. 154(b) by 292 days.

(21) Appl. No.: 14/374,342

(22) PCT Filed: Jan. 28, 2013

(86) PCT No.: PCT/IB2013/000094
§ 371 (c)(1),
(2) Date: Jul. 24, 2014

(87) PCT Pub. No.: WO2013/114171
PCT Pub. Date: Aug. 8, 2013

(65) Prior Publication Data
US 2015/0015434 A1    Jan. 15, 2015

(30) Foreign Application Priority Data

Jan. 30, 2012  (JP) .................. 2012-016851

(51) Int. Cl.
*G01S 13/93* (2006.01)
*G01S 13/04* (2006.01)
*G01S 13/46* (2006.01)

(52) U.S. Cl.
CPC ............ *G01S 13/931* (2013.01); *G01S 13/04* (2013.01); *G01S 2013/462* (2013.01); *G01S 2013/9346* (2013.01); *G01S 2013/9375* (2013.01)

(58) Field of Classification Search
CPC .. G01S 13/931; G01S 2013/9314–2013/9396; G01S 2013/462
See application file for complete search history.

(56) References Cited

U.S. PATENT DOCUMENTS 6,266,005 B1 * 7/2001 Schneider ............... G01S 13/42
                                                    342/118
6,377,205 B1 * 4/2002 Eckersten ............... G01S 7/412
                                                    342/27

(Continued)

FOREIGN PATENT DOCUMENTS

CN    101950018 A    1/2011
EP    1 923 717 A1   5/2008
(Continued)

*Primary Examiner* — Matthew M Barker
(74) *Attorney, Agent, or Firm* — Sughrue Mion, PLLC

(57) ABSTRACT

A peripheral object detection apparatus that is installed in a vehicle to detect a peripheral object obstructing travel by a vehicle includes: a radar that obtains a reflection intensity by transmitting an electromagnetic wave and receiving an electromagnetic wave reflected by an object; and a determination unit that calculates an integrated value of an amount of variation in the reflection intensity within a predetermined section, obtained by the radar, and determines on the basis of the integrated value whether or not the object is a low object not obstructing travel by the vehicle.

18 Claims, 5 Drawing Sheets

(56) References Cited

U.S. PATENT DOCUMENTS

| | | | |
|---|---|---|---|
| 6,404,328 B1 | 6/2002 | Alland et al. | |
| 6,429,804 B1 * | 8/2002 | Kishida | G01S 13/34 340/435 |
| 6,583,403 B1 * | 6/2003 | Koike | G01S 13/931 250/221 |
| 6,812,882 B2 * | 11/2004 | Ono | G01S 13/34 342/114 |
| 7,623,061 B2 * | 11/2009 | Spyropulos | G01S 7/412 342/170 |
| 8,149,158 B2 * | 4/2012 | Samukawa | G01S 13/345 342/105 |
| 8,558,733 B2 * | 10/2013 | Kamo | G01S 7/295 342/27 |
| 8,854,251 B2 * | 10/2014 | Tokoro | G01S 13/34 342/104 |
| 9,097,801 B2 * | 8/2015 | Kambe | G01S 13/867 |
| 9,140,788 B2 * | 9/2015 | Kuehnle | G01S 7/411 |
| 2005/0099332 A1 | 5/2005 | Nakano et al. | |
| 2008/0111733 A1 | 5/2008 | Spyropulos et al. | |
| 2011/0006941 A1 | 1/2011 | Samukawa et al. | |
| 2012/0313811 A1 | 12/2012 | Suzuki | |
| 2013/0082868 A1 * | 4/2013 | Ohkado | G01S 7/411 342/70 |

FOREIGN PATENT DOCUMENTS

| | | |
|---|---|---|
| JP | 2004-361154 A | 12/2004 |
| JP | 2008-102591 A | 5/2008 |
| JP | 2010-204033 A | 9/2010 |
| WO | 2011/070426 A2 | 6/2011 |
| WO | 2011092814 A1 | 8/2011 |
| WO | WO 2011158292 A1 * | 12/2011 ............ G01S 13/34 |

* cited by examiner

PERIPHERAL OBJECT DETECTION APPARATUS AND PERIPHERAL OBJECT DETECTION METHOD

BACKGROUND OF THE INVENTION

1. Field of the Invention

The invention relates to a peripheral object detection apparatus that is installed in a vehicle to detect a peripheral object obstructing travel by a vehicle, and a peripheral object detection method.

2. Description of Related Art

In a collision avoidance assist system such as a pre-crash system, an object (a vehicle or the like) obstructing travel by a vehicle must be detected with a high degree of precision. A radar such as a millimeter wave radar is used for the detection, and an object causing an obstruction is differentiated from an object positioned below the vehicle and therefore not obstructing travel (an object over which the vehicle can pass) on the basis of a reflection intensity obtained by the radar. In a vehicle radar apparatus described in Japanese Patent Application Publication No. 2010-204033 (JP-2010-204033 A), for example, when a reflection wave is detected by a radar, a difference between a detected waveform and a reference waveform is calculated. When an intensity of a resulting difference signal equals or exceeds a threshold, the reflection wave is determined to be from an unneeded object such as a manhole or a metal joint on the road.

An obstacle over which the vehicle cannot pass has at least a certain height from a ground surface. Therefore, paths along which electromagnetic waves (millimeter waves or the like) transmitted by the radar return to the radar after being reflected by the obstacle include a path along which the electromagnetic waves return directly from the obstacle and a path along which the electromagnetic waves reflected by the obstacle return indirectly after being further reflected by the ground surface. When the reflection waves, are received by the radar, the reflection intensity basically increases as a relative distance to the obstacle decreases. When reflection waves traveling in a multipath environment are received by the radar, however, the reflection waves traveling on the respective paths, which have varying distances, interfere with each other so as to be amplified or canceled out, and as a result, a plurality of peak portions and trough portions having large variation amounts are formed in a variation pattern of the reflection intensity relative to the relative distance (see FIG. 2C).

When a low object U1 (a steel plate used in construction work or the like) over which the vehicle can pass is disposed correctly on the ground surface, as shown in FIG. 5A, the low object U1 substantially does not project from the ground surface. Therefore, the only path along which the electromagnetic waves transmitted by the radar return to the radar after being reflected by the low object U1 is a path along which the electromagnetic waves return directly from the low object U1. When reflection waves traveling along a single path are received by the radar, the reflection intensity simply increases as the relative distance to the low object U1 decreases, and therefore the peak portions and trough portions formed in relation to the reflection intensity from the obstacle do not occur in the variation pattern of the reflection intensity relative to the relative distance (see FIG. 2A). Instead, a single large peak portion is formed in the variation pattern of the reflection intensity relative to the relative distance. In a conventional technique, low objects are differentiated from obstacles by focusing on the number of peak portions and trough portions in the reflection intensity.

In a case where a low object U2 overlaps with another low object, however, as shown in FIG. 5B, the vehicle is capable of passing over the low object U2, but the low object U2 projects slightly from the ground surface. Therefore, the paths along which the electromagnetic waves transmitted by the radar return to the radar after being reflected by the low object U2 include both the path along which the electromagnetic waves return directly from the low object U2 and paths along which the electromagnetic waves reflected by the low object U2 return indirectly after being further reflected by the ground surface. Far fewer paths along which the electromagnetic waves return after being reflected by the ground surface exist than in the case of the obstacle described above. Therefore, when reflection waves traveling in a multipath environment are received by the radar in this case, although as a whole the reflection intensity increases as the relative distance to the low object U2 decreases, peak portions and trough portions having small variation amounts are formed in the variation pattern of the reflection intensity relative to the relative distance (see FIG. 2B). This reflection intensity variation pattern is observed not only when a plurality of low objects overlap, but also when a low object is suspended above the ground surface and when the low object itself is thick. When this reflection intensity variation pattern is detected using the aforesaid method of focusing on the number of peak portions and trough portions in the reflection intensity, it may be impossible to differentiate correctly between a low object and an obstacle. When a low object over which the vehicle can pass safely is erroneously detected as an obstacle, unnecessary support may be provided by the collision avoidance support system.

SUMMARY OF THE INVENTION

The invention provides a peripheral object detection apparatus and a peripheral object detection method with which an object obstructing travel by a vehicle is detected with a high degree of precision.

A first aspect of the invention relates to a peripheral object detection apparatus that is installed in a vehicle to detect an obstacle obstructing travel by a vehicle. The peripheral object detection apparatus includes: a radar configures to obtain a reflection intensity by transmitting an electromagnetic wave and receiving an electromagnetic wave reflected by the object; and a determination unit configures to calculate an integrated value of an amount of variation in the reflection intensity within a predetermined section, obtained by the radar, and determine on the basis of the integrated value whether or not the object is a low object not obstructing travel by the vehicle.

An obstacle obstructing travel by the vehicle has at least a certain height from a ground surface, and therefore reflection waves return via a large number of paths. Hence, the reflection waves traveling along respective paths having varying distances interfere with each other, leading to large variation in the reflection intensity such that the integrated value of the amount of variation in the reflection intensity is also large. A low object not obstructing travel by the vehicle, on the other hand, substantially does not project from the ground surface, and therefore the reflection waves return via a single path or a small number of paths. Hence, variation in the reflection intensity is small (substantially non-existent in the case of a single path), and therefore the integrated value of the amount of variation in the reflection intensity is also small. The determination unit of the peripheral object detection apparatus according to the first aspect determines whether or not the object is a low object not obstructing travel by the vehicle on the basis of the integrated value of the amount of variation in the reflection intensity within the predetermined section. Therefore, a low object not obstructing travel by the vehicle can be identified with a high degree of precision, and as a result, an obstacle obstructing travel by the vehicle can be detected with a high degree of precision. By performing driver assist using information relating to obstacles detected with a high degree of precision in this manner, unnecessary driver assist can be suppressed, and therefore driver assist can be performed with a high degree of precision.

The determination unit may be configured to calculate at least one of a slope of the reflection intensity within the predetermined section and a maximum value of the amount of variation in the reflection intensity within the predetermined section, and determine whether or not the object is the low object on the basis of the integrated value and the at least one of the slope and the maximum value.

The determination unit may be configures to determine that the object is the low object when the integrated value is smaller than a first threshold.

As described above, in the case of a low object, variation in the reflection intensity is small, and therefore the integrated value of the amount of variation in the reflection intensity is also small. Hence, by determining whether or not the integrated value of the amount of variation in the reflection intensity within the predetermined section is smaller than the first threshold, it is possible to determine whether or not the object is a low object.

Further, the determination unit may be configured to calculate a slope of the reflection intensity within the predetermined section in addition to the integrated value, and determine that the object is the low object when the integrated value is smaller than the first threshold and the slope is smaller than a second threshold. Moreover, the determination unit may be configured to calculate a maximum value of the amount of variation in the reflection intensity within the predetermined section in addition to the integrated value (and the slope), and determine that the object is a low object when the integrated value is smaller than the first threshold (and the slope is smaller than the second threshold) and the maximum value is smaller than a third threshold.

The determination unit may be configured to determine that the object other than the low object is the obstacle obstructing travel by the vehicle. The low object may be an object positioned below the vehicle.

A second aspect of the invention relates to a peripheral object detection method for detecting an obstacle obstructing travel by a vehicle. The peripheral object detection method includes: obtaining a reflection intensity by transmitting an electromagnetic wave from a radar installed in the vehicle and receiving an electromagnetic wave reflected by an object; calculating an integrated value of an amount of variation in the obtained reflection intensity within a predetermined section; and determining on the basis of the integrated value whether or not the object is a low object not obstructing travel by the vehicle.

According to configurations described above, a low object not obstructing travel by the vehicle can be identified with a high degree of precision using the integrated value of the amount of variation in the reflection intensity within the predetermined section, and as a result, an obstacle obstructing travel by the vehicle can be detected with a high degree of precision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 2A to 2C are examples of variation in a reflection intensity relative to a relative distance, wherein FIG. 2A shows a reflection intensity resulting from reflection by a steel plate on a road, FIG. 2B shows a reflection intensity resulting from reflection by overlapping steel plates on a road, and FIG. 2C shows a reflection intensity resulting from reflection by a stopped vehicle;

FIGS. 5A and 5B are examples of low objects ahead not obstructing forward travel by a vehicle, wherein FIG. 5A shows a normal steel plate and FIG. 5B shows two overlapping steel plates.

DETAILED DESCRIPTION OF EMBODIMENTS

Figure 1:
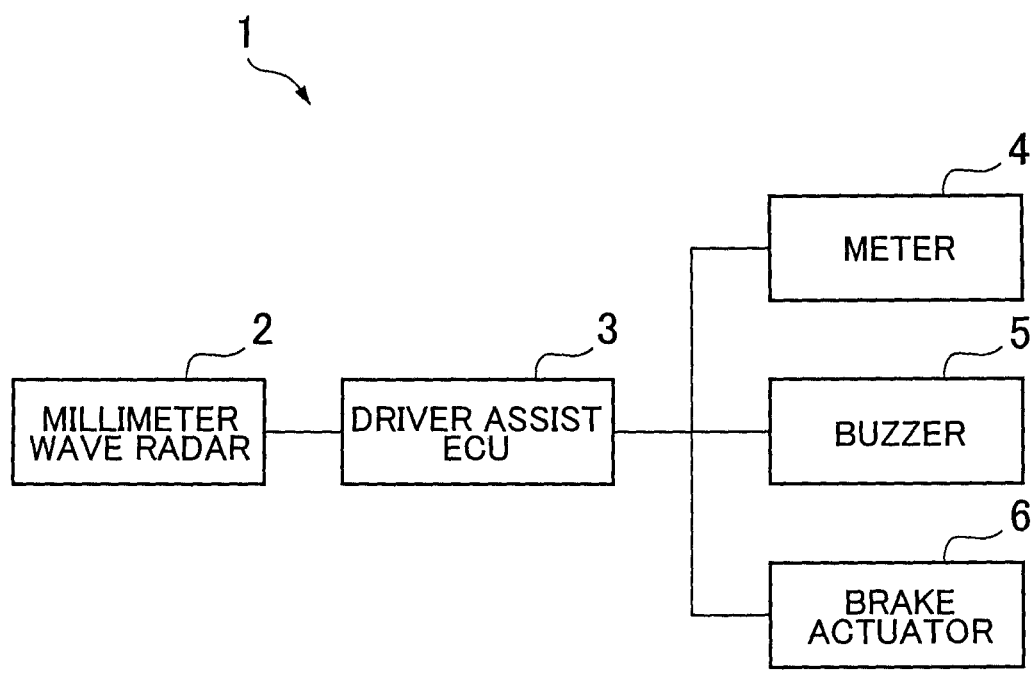
FIG. 1 is a view showing a configuration of a driver assist apparatus according to an embodiment.

An embodiment of a peripheral object detection apparatus according to the invention will be described below with reference to the drawings. Note that in the drawings, identical or corresponding elements have been allocated identical reference numerals, and duplicate description thereof has been omitted.

In this embodiment, the invention is applied to a driver assist apparatus installed in a vehicle. The driver assist apparatus according to this embodiment is a pre-crash system that assists a driver in avoiding a collision with an object obstructing travel by a host vehicle. In the driver assist apparatus according to this embodiment, an obstacle is detected using a millimeter wave radar, and when the possibility of a collision with the obstacle is recognized, a driver is provided with information (including a warning) via a human machine interface (HMI) and vehicle control (automatic braking or the like) is performed.

Obstacle detection using radar information from the millimeter wave radar according to this embodiment will now be described in detail. In particular, a method of identifying a low object (a steel plate used in construction work, a manhole, or an empty can, for example) not obstructing travel by the host vehicle from objects detected on a flat road by the millimeter wave radar with a high degree of precision and detecting a detected object other than a low object as an obstacle obstructing travel by the host vehicle will be described. The low object is an object positioned below the vehicle. The obstacle corresponds in particular to a stopped vehicle (a static object). A moving object such as a traveling vehicle moves at an arbitrary speed, and therefore low objects (static objects) can be identified with a high degree of precision by another method using a relative speed or the like. Another method is also preferably used to identify low objects from objects detected on a slope (in particular a boundary between a slope and a flat road).

Figure 2A:
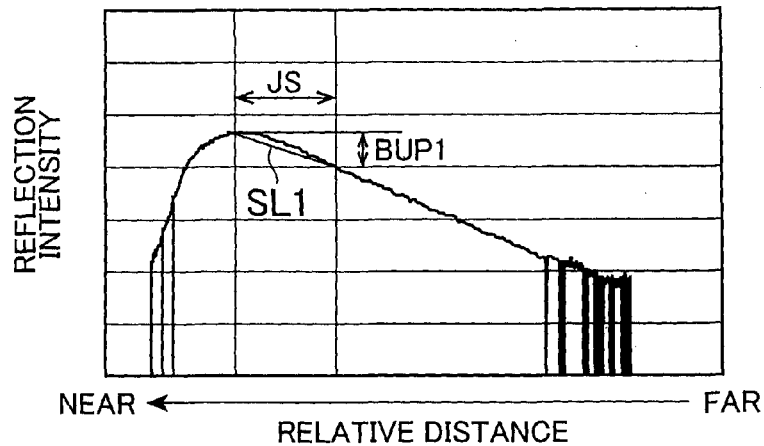
Figure 2B:
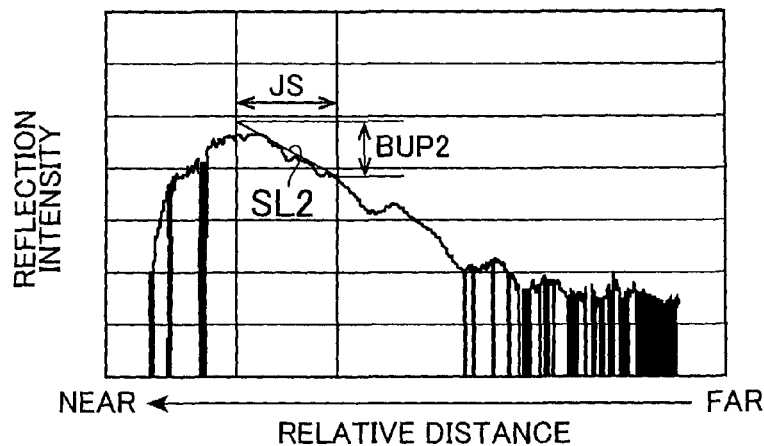
Figure 2C:
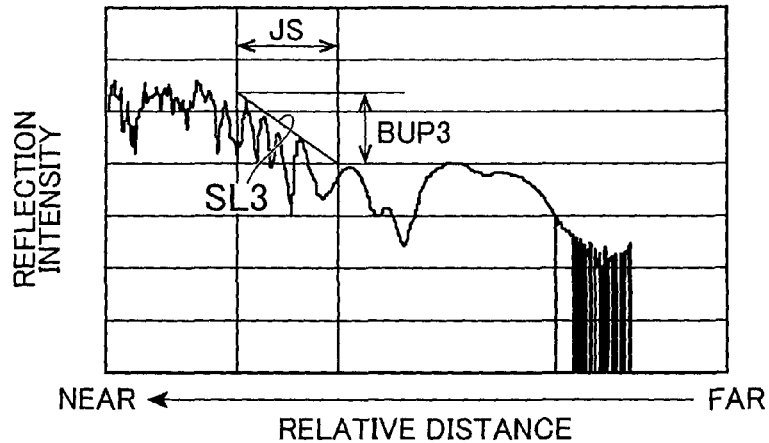
Figure 3:
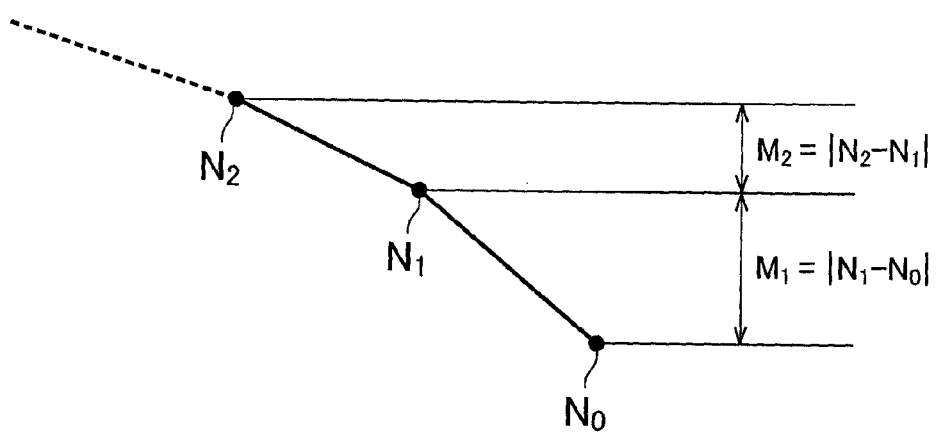
FIG. 3 is an illustrative view showing a method of calculating an integrated value of an amount of variation in the reflection intensity.

Referring to FIGS. 1 to 3, a driver assist apparatus 1 will be described. FIG. 1 is a view showing a configuration of the driver assist apparatus according to this embodiment. FIGS.

2A to 2C are examples of variation in a reflection intensity relative to a relative distance. FIG. 3 is an illustrative view showing a method of calculating an integrated value of an amount of variation in the reflection intensity.

In the driver assist apparatus 1, an integrated value of an amount of variation in a reflection intensity within a determination section of a relative distance is used to identify obstacles and low objects with a high degree of precision. Further, in the driver assist apparatus 1, a slope of an increase in the reflection intensity within the determination section and a maximum value of a vertical variation amount in the reflection intensity between adjacent peak portions and trough portions within the determination section are used to improve a determination precision.

The driver assist apparatus 1 includes a millimeter wave radar 2, a driver assist ECU 3, a meter 4, a buzzer 5, and a brake actuator 6. Note that in this embodiment, the millimeter wave radar 2 functions as a radar, and the driver assist ECU 3 (during obstacle detection processing) functions as a determination unit.

The millimeter wave radar 2 is a scanning radar for detecting an object using millimeter wave band electromagnetic waves. The millimeter wave radar 2 is mounted in a center of a front side of the host vehicle. The millimeter wave radar 2 rotates a transmission unit and a reception unit in a left-right direction at fixed time intervals, transmits a millimeter wave frontward at respective scanning angles in the left-right direction, and receives a returning millimeter wave reflected by an object. Further, the millimeter wave radar 2 calculates a relative distance, a relative speed, a lateral position (a scanning angle), and so on by performing FFT analysis on each received reflection point (detection point). The millimeter wave radar 2 then transmits radar information (the relative distance, relative speed, lateral position, reflection intensity, and so on) relating to each reflection point to the driving assist ECU 3 as a radar signal.

The driver assist ECU 3 is an ECU constituted by a central processing unit (CPU), a read only memory (ROM), a random access memory (RAM), and so on. The driver assist ECU 3 performs overall control of the driver assist apparatus 1. The driver assist ECU 3 receives the radar signal from the millimeter wave radar 2 at fixed time intervals, and stores the radar information (time series data) in time series for each reflection point. More specifically, the driver assist ECU 3 considers reflection points having an identical (or substantially identical) lateral position (scanning angle) and a gradually decreasing relative distance as reflection points from an identical object, and stores time series data for each of the reflection points. Further, the driver assist ECU 3 performs obstacle detection processing in relation to each reflection point using the time series data, performs collision determination processing when an obstacle is detected, performs assist control processing when the possibility of a collision is recognized, and transmits control signals respectively to the meter 4, the buzzer 5, and the brake actuator 6 when assist is required. Note that conventional processing is applied to the collision determination processing and the support control processing, and therefore description thereof will be kept brief, whereas the obstacle detection processing will be described in detail.

Before describing the various processing, variation in the reflection intensity relative to the relative distance from the host vehicle to the object will be described. FIGS. 2A to 2C show examples of variation in the reflection intensity relative to the relative distance obtained from time series data relating to a reflection point detected at a certain scanning angle.

Figure 5A:
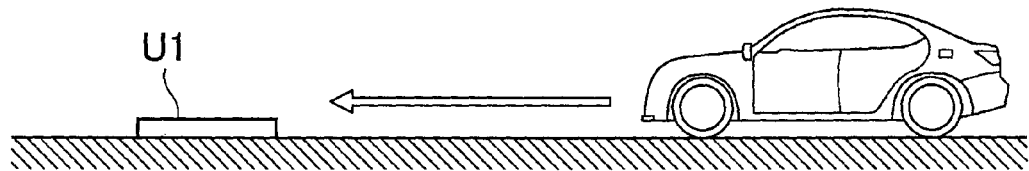

The example in FIG. 2A shows variation in the reflection intensity when an electromagnetic wave is reflected by a steel plate U1 on a road, such as that as shown in FIG. 5A. In the case of the normal steel plate U1 (or a manhole or the like), the only path along which the millimeter waves transmitted by the millimeter wave radar 2 return to the millimeter wave radar 2 after being reflected by the steel plate U1 is a single path along which the millimeter waves return directly from the steel plate U1. Hence, a situation in which reflection waves interfere with each other does not arise, and therefore the reflection intensity simply increases as the relative distance decreases such that a single large peak portion is formed in a variation pattern of the reflection intensity relative to the relative distance. The increase in the reflection intensity in this case is comparatively small.

Figure 5B:
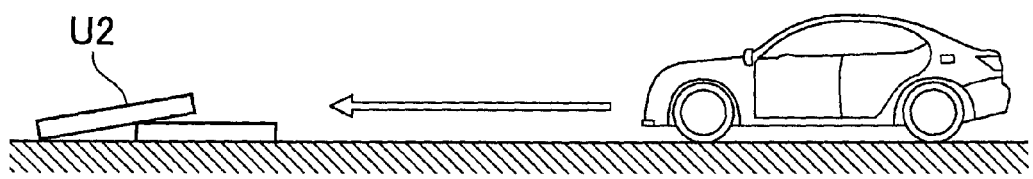

The example in FIG. 2B shows variation in the reflection intensity when an electromagnetic wave is reflected by a steel plate U2 such as that as shown in FIG. 5B. The steel plate U2 partially overlaps another steel plate. The steel plate U2 has a greater height from the ground surface than the normal steel plate U1 described above. However, the height of the steel plate U2 is sufficiently low that the vehicle can pass over the steel plate U2. Accordingly, the paths along which the millimeter waves transmitted by the millimeter wave radar 2 return to the millimeter wave radar 2 after being reflected by the steel plate U2 include not only the path along which the millimeter waves return directly from the steel plate U2, but also several paths along which the millimeter waves reflected by the steel plate U2 return indirectly after being further reflected by the ground surface. In this case, the variation in the reflection intensity relative to the relative distance shows a similar tendency to that of the normal steel plate U1 shown in FIG. 2A. However, due to multipath, albeit in a small number of the paths, the reflection waves traveling along the respective paths, which have varying distances, interfere with each other so as to be amplified or canceled out, and as a result, peak portions and trough portions having a small variation amount are formed in the variation pattern of the reflection intensity relative to the relative distance. This variation pattern in the reflection intensity relative to the relative distance is observed not only when a steel plate partially overlaps another steel plate, but also when a steel plate is suspended and when the object is an empty can or the like having a certain height from the ground surface.

The example in FIG. 2C shows variation in the reflection intensity when an electromagnetic wave is reflected by a stopped vehicle. A vehicle has at least a certain height from the ground surface. Therefore, the paths along which the millimeter waves transmitted by the millimeter wave radar 2 return to the millimeter wave radar 2 after being reflected by the stopped vehicle include not only the path along which the millimeter waves return directly from the stopped vehicle, but also a large number of paths along which the millimeter waves reflected by the stopped vehicle return after being further reflected by the ground surface. In this case, the reflection intensity basically increases as the relative distance decreases. However, due to multipath including a large number of paths, the reflection waves traveling along the respective paths, which have varying distances, interfere with each other so as to be amplified or canceled out, and as a result, peak portions and trough portions having a large variation amount are formed in the variation pattern of the reflection intensity relative to the relative distance. Further, the increase in the reflection intensity is greater than those obtained from the steel plates U1, U2, and the amount of variation in the reflection intensity between the peak portions and the trough portions is greater than that obtained from the steel plate U2. In a reflection intensity variation pattern that includes a plurality of peak portions and trough portions having large variation amounts, the integrated value of the amount of variation in the reflection intensity (a value corresponding to a length of a line on a graph shown in FIG. 2C) is much larger than the integrated values of the amounts of variation in the reflection intensity obtained from the steel plates U1, U2.

The obstacle detection processing will now be described. The driver assist ECU 3 obtains the variation in the reflection intensity relative to the relative distance from the time series data for each reflection point. The driver assist ECU 3 then identifies peak portions (projecting portions) and trough portions (NULL portions) by analyzing a waveform of the reflection intensity relative to the relative distance for each reflection point. The driver assist ECU 3 then stores each point having a relative distance corresponding to a peak portion after setting a peak confirmation flag at 1 in relation thereto, and stores each point having a relative distance corresponding to a trough portion after setting a trough confirmation flag at 1 in relation thereto. In the example shown in FIG. 2A, only one large peak portion is identified. In the example shown in FIG. 2B, a plurality of small peak portions and trough portions are identified. In the example shown in FIG. 2C, a plurality of large peak portions and trough portions are identified. Note that very small variations in the reflection intensity caused by noise, vehicle vibration, and so on during detection by the millimeter wave radar 2 are not identified as peak portions and trough portions.

The driver assist ECU 3 calculates a slope of the reflection intensity within a determination section JS of the relative distance for each reflection point. The slope of the reflection intensity indicates the increase in the reflection intensity, and may be calculated using a following method. When two or more peak portions are determined to exist within the determination section JS on the basis of the peak confirmation flag, a slope SL is calculated from the reflection intensity at an apex of a peak portion located at a point where the relative distance is shortest, and the reflection intensity at an apex of a peak portion located at a point where the relative distance is longest. When no more than one peak portion is determined to exist within the determination section JS on the basis of the peak confirmation flag, the slope SL is calculated from the reflection intensity at the point within the determination section JS where the relative distance is shortest and the reflection intensity at the point where the relative distance is longest. FIGS. 2A, 2B, and 2C respectively show reflection intensity slopes SL1, SL2, SL3 within the determination section JS.

The determination section JS is a section in which millimeter waves traveling in a multipath environment can be received sufficiently by the millimeter wave radar 2 when millimeter waves transmitted by the millimeter wave radar 2 return after being reflected by an object. Further, the determination section JS is a section in which an obstacle can be detected at a timing allowing sufficient leeway for collision avoidance assist by the pre-crash system. The determination section JS is set in advance on the basis of data obtained in an actual vehicle experiment, and is set as a section having a length of several tens of meters and located several tens of meters in front of the obstacle.

Further, the driver assist ECU 3 successively calculates absolute values of a difference in the reflection intensity at fixed time intervals within the determination section JS for each reflection point, and calculates an integrated value ES by integrating the absolute values of the difference. Reflection intensities detected at fixed time intervals within the determination section JS by the millimeter wave radar 2 are used in this calculation. Note, however, that reflection intensities obtained when a speed of the vehicle is no higher than a lower limit speed below which the relative distance substantially does not vary are not used. As shown in FIG. 3, when the reflection intensity detected at the point having the longest relative distance within the determination section JS is set as $N_0$ and the reflection intensity detected at the point having the shortest relative distance is set as $N_n$, absolute values $M_1=|N_1-N_0|$, $M_2=|N_2-N_1|$, . . . , $M_n=|N_n-N_{n-1}|$ of the difference in the reflection intensity are calculated successively using reflection intensities $N_0$, $N_1$, $N_2$, . . . , $N_n$, whereupon an integrated value $ES=M_1+M_2+\ldots+M_n$ of the absolute values $M_1, M_2, \ldots, M_n$ of the difference is calculated.

Furthermore, the driver assist ECU 3 calculates a base up amount BUP of the reflection intensity within the determination section JS for each reflection point using the slope SL of the reflection intensity. The reflection intensity at the point having the longest relative distance on a straight line indicating the slope SL within the determination section JS is determined, the reflection intensity at the point having the shortest relative distance on the straight line indicating the slope SL within the determination section JS is determined, and an absolute value of a difference between the two reflection intensities is set as the base up amount BUP. FIGS. 2A, 2B, and 2C respectively show base up amounts BUP1, BUP2, and BUP3 of the reflection intensity within the determination section JS.

The driver assist ECU 3 then subtracts the base up amount BUP from the integrated value ES of the absolute values of the difference in the reflection intensity within the determination section JS for each reflection point, and sets a resulting subtracted value as an integrated value CES of the amount of variation in the reflection intensity within the determination section JS.

The driver assist ECU 3 then extracts combinations of adjacent peak portions and trough portions within the determination section JS using the peak confirmation flag and the trough confirmation flag for each reflection point, and calculates an amount of variation in the reflection intensity between the peak portion and the trough portion of each combination (an absolute value of a difference between the reflection intensity at the apex of the peak portion and the reflection intensity at a lowest point of the trough portion). The driver assist ECU 3 then extracts a maximum variation amount value from the amounts of variation in the reflection intensity between the peak portions and the trough portions of all of the combinations, and sets this maximum value as a maximum variation amount CMX. Note that in cases where only one peak portion is formed, such as when the millimeter waves are reflected by a normal steel plate (as in the example shown in FIG. 2A), or no peak portions are formed, the maximum variation amount CMX is set at zero.

When the relative distance becomes shorter than the shortest relative distance within the determination section JS, the driver assist ECU 3 determines, in relation to each reflection point, whether or not three following conditions are satisfied in order to differentiate between a low object and an obstacle. A first condition is whether or not the slope SL of the reflection intensity is smaller than a slope threshold TA. Comparing the slopes SL1, SL2 of FIGS. 2A and 2B to the slope SL3 of FIG. 2C, the slope SL3 is larger. A second condition is whether or not the integrated value CES of the amount of variation in the reflection intensity is smaller than an integrated value threshold TB. This condition is based on the fact that the integrated value of the amount of variation in the reflection intensity within the determination section JS is larger in the case of an obstacle than in the case of a low object. Comparing the lengths of the lines on the graphs within the determination section JS in FIGS. 2A and 2B to the length of the line on the graph within the determination section JS in FIG. 2C, the line on the graph within the determination section JS in FIG. 2C is clearly longer. A third condition is whether or not the maximum variation amount CMX is smaller than a maximum variation amount threshold TC. This condition is based on the fact that the difference between the reflection intensity at the apex of the peak portion and the reflection intensity at the lowest point of the trough portion is larger in the case of an obstacle than in the case of a low object. Comparing the differences between the peak portions and the trough portions in the determination section JS of FIG. 2B to the differences between the peak portions and the trough portions in the determination section JS of FIG. 2C, the differences between the peak portions and the trough portions in the determination section JS of FIG. 2C are clearly greater. No trough portions exist in the determination section JS of FIG. 2A. Note that the slope threshold TA, the integrated value threshold TB, and the maximum variation amount threshold TC are thresholds for differentiating between a low object and an obstacle, and are set in advance on the basis of data obtained in an actual vehicle experiment.

When the slope SL of the reflection intensity is smaller than the slope threshold TA, the integrated value CES of the amount of variation in the reflection intensity is smaller than the integrated value threshold TB, and the maximum variation amount CMX is smaller than the maximum variation amount threshold TC, the driver assist ECU 3 determines, in relation to each reflection point, that the corresponding reflection point is a reflection point from a low object, or in other words that the object corresponding to the reflection point is a low object, and sets a low object flag at 1. In all other cases, the driver assist ECU 3 determines that the corresponding reflection point is a reflection point from an obstacle, or in other, words that the object corresponding to the reflection point is an obstacle, and sets the low object flag at 0. In the examples of FIGS. 2A to 2C, the normal steel plate of FIG. 2A and the overlapping steel plates of FIG. 2B are determined to be low objects, while the stopped vehicle of FIG. 2C is determined to be an obstacle. Note that in this determination, a reflection point may be determined to be from a low object as long as at least the integrated value CES of the amount of variation in the reflection intensity is smaller than the integrated value threshold TB.

The collision determination processing will now be described. When the low object flag set in relation to each reflection point in the obstacle detection processing is at 0 (when the object is an obstacle), the driver assist ECU 3 calculates a time to collision (TTC) (relative distance/relative speed) on the basis of the relative distance and the relative speed between the host vehicle and the obstacle. The driver assist ECU 3 then determines whether or not the TTC is within an activation timing of the pre-crash system. When the TTC is equal to or smaller than the activation timing of the pre-crash system, the driver assist ECU 3 determines that the vehicle possibly collide with the obstacle. Note that this collision determination processing is merely an example, and other conventionally available collision determination processing may be applied instead.

The support control processing will now be described. The driver assist ECU 3 determines a likelihood of a collision on the basis of the TTC and so on in relation to each obstacle determined to possibly collide with the vehicle with in the collision determination processing, and determines assist content in accordance with the likelihood of a collision. The driver assist ECU 3 then sets a control signal in accordance with the determined assist content, and transmits the control signal to the meter 4, the buzzer 5, and the brake actuator 6. For example, the likelihood of a collision is determined to be higher as the TTC decreases. When the likelihood of a collision is low (when the likelihood of a collision is no higher than a first predetermined value, for example), issuance of a caution by illuminating a warning lamp of the pre-crash system is determined as the assist content, whereupon a warning lamp illumination signal is transmitted to the meter 4. When the likelihood of a collision increases (when the likelihood of a collision is higher than the first predetermined value but no higher than a second predetermined value, for example), issuance of a warning by outputting a buzzer sound is determined as the assist content, whereupon a buzzer sound output signal is transmitted to the buzzer 5. When the likelihood of a collision increases further (when the likelihood of a collision is higher than the second predetermined value, for example), automatic braking through brake control is determined as the assist content, whereupon a target brake oil pressure required for collision avoidance is calculated and a brake control signal indicating the target brake oil pressure is transmitted to the brake actuator 6. Note that this support control processing is merely an example, and other conventionally available support control processing may be applied instead.

The meter 4 is a combination meter including a speedometer, a tachometer, various gauges such as a fuel gauge, various warning lamps relating to charging, half-shut doors, fuel, oil pressure, the pre-crash system, and so on, and the like. In particular, upon reception of the warning lamp illumination signal relating to the pre-crash system from the driver assist ECU 3, the warning lamp of the pre-crash system is illuminated on the meter 4.

The buzzer 5 is a device that outputs a buzzer sound to inform a driver that the vehicle possibly has a collision. Upon reception of the buzzer sound output signal from the driver assist ECU 3, the buzzer sound is output from the buzzer 5.

The brake actuator 6 is an actuator for adjusting the brake oil pressure of respective vehicle wheels. Upon reception of the brake control signal from the driver assist ECU 3, the brake actuator 6 adjusts the brake oil pressure to the target brake oil pressure indicated by the brake control signal. As a result, an automatic brake is activated, whereby the vehicle is decelerated (stopped).

Figure 4:
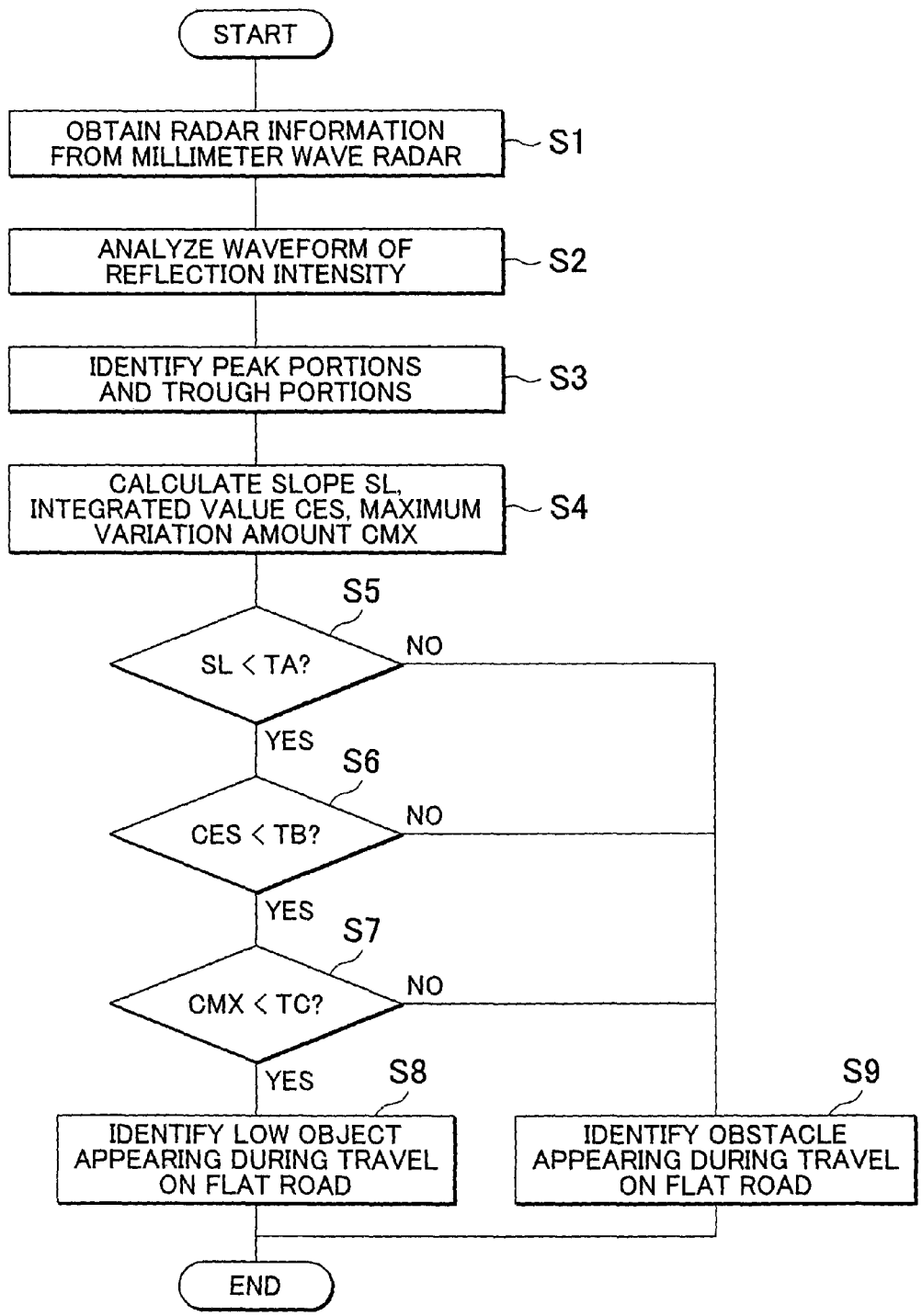
FIG. 4 is a flowchart showing a flow of obstacle detection processing executed by an operation support electronic control unit (ECU) shown in FIG. 1.

Referring to FIGS. 1 to 3, an operation of the driver assist apparatus 1 will be described. In particular, the obstacle detection processing executed by the driver assist ECU 3 will be described using a flowchart shown in FIG. 4. FIG. 4 is a flowchart showing a flow of the obstacle detection processing executed by the driver assist ECU shown in FIG. 1.

The millimeter wave radar 2 transmits millimeter waves frontward from the host vehicle at fixed time intervals while scanning in the left-right direction, receives reflected millimeter waves, and transmits radar information relating to respective reflection points (detection points) to the driver assist ECU 3 as radar signals. The driver assist ECU 3 receives the radar signals and obtains the radar information for each reflection point (S1). The driver assist ECU 3 then stores time series data for each reflection point.

The driver assist ECU 3 then analyzes the waveform (a waveform indicating variation in the reflection intensity relative to the relative distance) of the reflection intensity within the determination section JS in relation to each reflection point (S2). The driver assist ECU 3 then identifies peak portions (projecting points) and trough portions (NULL points), sets the peak confirmation flag and the trough confirmation flag in relation to the points identified as peak portions and the points identified as trough portions, and then stores the respective points (S3).

The driver assist ECU 3 uses the peak confirmation flag and the trough confirmation flag to calculate, in relation to each reflection point, the slope SL of the reflection intensity, the integrated value CES of the amount of variation in the reflection intensity, and the maximum variation amount CMX between the peak portions and the trough portions from the variation in the reflection intensity relative to the relative distance within the determination section JS (S4). The driver assist ECU 3 then determines, in relation to each reflection point, whether or not the slope SL is smaller than the slope threshold TA (S5), determines whether or not the integrated value CES is smaller than the integrated value threshold TB (S6) when the slope SL is smaller than the slope threshold TA (YES in S5), and determines whether or not the maximum variation amount CMX is smaller than the maximum variation amount threshold TC (S7) when the integrated value CES is smaller than the integrated value threshold TB (YES in S6). When the maximum variation amount CMX is smaller than the variation amount threshold TC (YES in S7), the driver assist ECU 3 determines that the object corresponding to the reflection point is a low object appearing during travel on a flat road, and accordingly sets the low object flag at 1 (S8). In all other cases (NO in S5, NO in S6, or NO in S7), the driver assist ECU 3 determines that the object corresponding to the reflection point is an obstacle appearing during travel on a flat road, and accordingly sets the low object flag at 0 (S9).

For each reflection point at which the low object flag=0 (i.e. for each obstacle), the driver assist ECU 3 determines whether or not the possibility of a collision between the host vehicle and the obstacle exists. When a collision possibly occur between the host vehicle and the obstacle, the driver assist ECU 3 determines the likelihood of the collision, determines the assist content in accordance with the likelihood of the collision, and transmits a control signal to the meter 4, the buzzer 5, and the brake actuator 6 in accordance with the assist content. In the meter 4, the warning lamp of the PCS is illuminated upon reception of the PCS warning lamp illumination signal from the driver assist ECU 3. In the buzzer 5, the buzzer sound is output upon reception of the buzzer sound output signal from the driver assist ECU 3. In the brake actuator 6, the automatic brake is activated by adjusting the brake oil pressure in accordance with the brake control signal upon reception of the brake control signal from the driver assist ECU 3.

With the driver assist apparatus 1 according to this embodiment, a low object not obstructing vehicle travel on a flat road can be identified with a high degree of precision using the integrated value CES of the amount of variation in the reflection intensity within the determination section JS, and as a result, an obstacle obstructing vehicle travel can be detected with a high degree of precision. In particular, objects from which reflection waves return in a multipath environment, for example in cases where steel plates overlap, a steel plate is suspended above the road surface, an object such as an empty can projects from the road surface, and so on, can be identified correctly as low objects. As a result, a low object over which the vehicle can pass safely is not detected erroneously as an obstacle, and therefore unnecessary activation of the pre-crash system in response to a low object can be suppressed.

Further, according to the driver assist apparatus 1, the slope SL of the reflection intensity and the maximum variation amount CMX between the peak portions and the trough portions are used in addition to the integrated value CES of the amount of variation in the reflection intensity within the determination section JS, and therefore a low object can be identified with an even higher degree of precision.

An embodiment of the invention was described above, but the invention is not limited to the above embodiment and may be implemented in various embodiments.

For example, in this embodiment, the invention is applied to the driver assist apparatus as a pre-crash system, but the invention may be applied to another kind of a driver assist apparatus requiring information relating to peripheral objects, or to a peripheral object detection apparatus itself.

Further, in this embodiment, the millimeter wave radar is used as a radar, but another radar, such as a microwave radar, may be used instead.

Furthermore, in this embodiment, obstacle detection (low object identification) is performed in the driver assist ECU, but obstacle detection may be performed in the radar.

Moreover, in this embodiment, obstacles and low objects are identified on the basis of the slope of the reflection intensity and the maximum variation amount between the peak portions and the trough portions of the reflection intensity in addition to the integrated value of the amount of variation in the reflection intensity within the determination section, but identification may be performed using the integrated value of the amount of variation in the reflection intensity alone, or using the integrated value of the amount of variation in the reflection intensity and any one of the slope of the reflection intensity, and the maximum variation amount between the peak portions and the trough portions of the reflection intensity.

Furthermore, in this embodiment, the absolute values of the difference in the reflection intensity detected at fixed time intervals by the millimeter wave radar are calculated, the absolute values of the differences are integrated, the base up amount is subtracted from a resulting integrated value, and the subtracted value is used as the integrated value of the amount of variation in the reflection intensity within the determination section. However, the integrated value obtained by integrating the absolute values of the difference in the reflection intensity may be used as is, or the integrated value of the amount of variation in the reflection intensity within the determination section may be determined using another calculation method.

The invention claimed is:

1. A peripheral object detection apparatus that is installed in a vehicle to detect an obstacle obstructing travel by the vehicle, comprising:
   a radar configured to obtain a reflection intensity by transmitting an electromagnetic wave and receiving an electromagnetic wave reflected by an object; and
   a driver assist ECU configured to:
      calculate a first integrated value comprising an integrated value of absolute values of differences in the reflection intensity within a predetermined section where values of reflection intensity are obtained by the radar, calculate a base up amount of the reflection intensity within the predetermined section for each reflection point using a slope of the reflection intensity, and determine on the basis of a second integrated value, obtained by subtracting the base up amount from the first integrated value, whether or not the object is a low object not obstructing travel by the vehicle.

2. The peripheral object detection apparatus according to claim 1, wherein the driver assist ECU is configured to calculate at least one of a slope of the reflection intensity within the predetermined section where values of reflection intensity are obtained and a maximum value of an amount of variation in the reflection intensity within the predetermined section where values of reflection intensity are obtained, and determine whether or not the object is a low object on the basis of the second integrated value and the at least one of the slope and the maximum value.

3. The peripheral object detection apparatus according to claim 1, wherein the driver assist ECU is configured to determine that the object is a low object when the second integrated value is smaller than a first threshold.

4. The peripheral object detection apparatus according to claim 3, wherein the driver assist ECU is configured to calculate a slope of the reflection intensity within the predetermined section where values of reflection intensity are obtained, and determine that the object is a low object when the second integrated value is smaller than the first threshold and the slope is smaller than a second threshold.

5. The peripheral object detection apparatus according to claim 3, wherein the driver assist ECU is configured to calculate a maximum value of an amount of variation in the reflection intensity within the predetermined section where values of reflection intensity are obtained, and determines that the object is a low object when the second integrated value is smaller than the first threshold and the maximum value is smaller than a second threshold.

6. The peripheral object detection apparatus according to claim 3, wherein the driver assist ECU is configured to calculate a slope of the reflection intensity within the predetermined section where values of reflection intensity are obtained and a maximum value of an amount of variation in the reflection intensity within the predetermined section where values of reflection intensity are obtained, and determine that the object is a low object when the second integrated value is smaller than the first threshold, the slope is smaller than a second threshold, and the maximum value is smaller than a third threshold.

7. The peripheral object detection apparatus according to claim 1, wherein the driver assist ECU is configured to determine that if the object is not a low object, the object is an obstacle obstructing travel by the vehicle.

8. The peripheral object detection apparatus according to claim 1, wherein the low object is an object over which the vehicle can pass.

9. The peripheral object detection apparatus according to claim 1, wherein the radar transmits and receives millimeter waves, and the predetermined section is a section in which millimeter waves traveling in a multipath environment can be sufficiently received by the radar when millimeter waves transmitted by the radar return after being reflected by an object.

10. The peripheral object detection apparatus according to claim 1, wherein the predetermined section is a section in which the object can be detected before collision so that collision avoidance assist by a pre-crash system can be activated.

11. The peripheral object detection apparatus according to claim 1, wherein the predetermined section is set in advance based on data obtained in an actual vehicle experiment.

12. A peripheral object detection method for detecting an obstacle obstructing travel by a vehicle, comprising:

obtaining a reflection intensity by transmitting an electromagnetic wave from a radar installed in the vehicle and receiving an electromagnetic wave reflected by an object;

calculating a first integrated value comprising an integrated value of absolute values of differences in the obtained reflection intensity within a predetermined section where values of reflection intensity are obtained;

calculating a base up amount of the reflection intensity within the predetermined section for each reflection point using a slope of the reflection intensity, and determining on the basis of a second integrated value, obtained by subtracting the base up amount from the first integrated value, whether or not the object is a low object not obstructing travel by the vehicle.

13. The peripheral object detection method according to claim 12, wherein obtaining a reflection intensity comprises transmitting a millimeter wave and receiving the millimeter wave reflected by the object; and the predetermined section is a section in which millimeter waves traveling in a multipath environment can be sufficiently received by the radar when millimeter waves transmitted by the radar return after being reflected by an object.

14. The peripheral object detection method according to claim 12, further comprising setting the predetermined section as a section in which the object can be detected before collision so that collision avoidance assist by a pre-crash system can be activated.

15. The peripheral object detection method according to claim 12, further comprising setting the predetermined section in advance based on data obtained in an actual vehicle experiment.

16. The peripheral object detection method according to claim 12, further comprising calculating a slope of the reflection intensity within the predetermined section of values of reflection intensity, and determining that the object is a low object when the second integrated value is smaller than a first threshold and the slope is smaller than a second threshold.

17. The peripheral object detection method according to claim 12, further comprising calculating a maximum value of an amount of variation in the reflection intensity within the predetermined section of values of reflection intensity, and determining that the object is a low object when the second integrated value is smaller than a first threshold and the maximum value is smaller than a second threshold.

18. The peripheral object detection method according to claim 12, further comprising calculating a slope of the reflection intensity within the predetermined section of values of reflection intensity and a maximum value of an amount of variation in the reflection intensity within the predetermined section of values of reflection intensity, and determining that the object is a low object when the second integrated value is smaller than a first threshold, the slope is smaller than a second threshold, and the maximum value is smaller than a third threshold.

* * * * *